(12) United States Patent
Lu et al.

(10) Patent No.: US 9,532,340 B2
(45) Date of Patent: Dec. 27, 2016

(54) TECHNIQUES FOR ENABLING AND PERFORMING HARQ TRANSMISSIONS IN A D2D COMMUNICATION BETWEEN WIRELESS DEVICES IN A WIRELESS TELECOMMUNICATIONS NETWORK

(71) Applicant: Telefonaktiebolaget L M Ericsson (publ), Stockholm (SE)

(72) Inventors: Qianxi Lu, Beijing (CN); Qingyu Miao, Beijing (CN); Zhenshan Zhao, Beijing (CN)

(*) Notice: Subject to any disclaimer, the term of this patent is extended or adjusted under 35 U.S.C. 154(b) by 11 days.

(21) Appl. No.: 14/650,844

(22) PCT Filed: Dec. 14, 2012

(86) PCT No.: PCT/SE2012/051391
§ 371 (c)(1),
(2) Date: Jun. 9, 2015

(87) PCT Pub. No.: WO2014/092619
PCT Pub. Date: Jun. 19, 2014

(65) Prior Publication Data
US 2015/0319746 A1      Nov. 5, 2015

(51) Int. Cl.
*H04J 3/00* (2006.01)
*H04W 72/04* (2009.01)
(Continued)

(52) U.S. Cl.
CPC ........ *H04W 72/0406* (2013.01); *H04L 1/1812* (2013.01); *H04L 1/1854* (2013.01);
(Continued)

(58) Field of Classification Search
CPC ...................................................... H04B 1/56
See application file for complete search history.

(56) References Cited

U.S. PATENT DOCUMENTS

| | | |
|---|---|---|
| 2011/0255450 A1 | 10/2011 | Wang et al. |
| 2012/0106517 A1 | 5/2012 | Charbit et al. |

(Continued)

FOREIGN PATENT DOCUMENTS

| | | |
|---|---|---|
| JP | 2013530570 A | 7/2013 |
| WO | WO-2012/019348 (A1) | 2/2012 |

(Continued)

OTHER PUBLICATIONS

"Notification of Transmittal of the International Search Report and the Written Opinion of the International Searching Authority," for Counterpart PCT Application No. PCT/SE2012/051391, mailed Aug. 2, 2013, 11 pages.

(Continued)

*Primary Examiner* — Samina Choudhry
(74) *Attorney, Agent, or Firm* — Nicholson De Vos Webster & Elliot, LLP

(57) ABSTRACT

A method performed by a network node for enabling Hybrid Automatic Repeat reQuest (HARQ) transmissions in a device-to-device (D2D) communication between a first wireless device and a second wireless device in a wireless telecommunications network is provided. The first and the second wireless device are served by the network node, which transmits information to at least the first and second wireless device indicating transmission resources to be used when transmitting a HARQ acknowledgement (A/N) transmission for a received data transmission in the D2D communication. The network node determines a Time-Division Duplexing (TDD) configuration for data transmissions in the D2D communication between the first and the second wireless device, and transmits the determined TDD configuration to the first and second wireless device.

14 Claims, 13 Drawing Sheets

(51) Int. Cl.
  *H04W 76/04* (2009.01)
  *H04W 48/12* (2009.01)
  *H04L 5/14* (2006.01)
  *H04L 1/18* (2006.01)
  *H04W 84/18* (2009.01)
  *H04W 88/02* (2009.01)
  *H04W 92/18* (2009.01)

(52) U.S. Cl.
  CPC .......... *H04L 1/1864* (2013.01); *H04L 1/1896* (2013.01); *H04L 5/14* (2013.01); *H04W 48/12* (2013.01); *H04W 72/042* (2013.01); *H04W 76/046* (2013.01); *H04W 84/18* (2013.01); *H04W 88/02* (2013.01); *H04W 92/18* (2013.01)

(56) References Cited

U.S. PATENT DOCUMENTS

| | | | |
|---|---|---|---|
| 2012/0163252 A1 | 6/2012 | Ahn et al. | |
| 2013/0142268 A1* | 6/2013 | Gao | H04W 72/04 375/252 |
| 2013/0208587 A1* | 8/2013 | Bala | H04W 16/14 370/230 |
| 2013/0223356 A1* | 8/2013 | Khoshnevis | H04W 72/042 370/329 |
| 2015/0063095 A1* | 3/2015 | Deng | H04W 8/005 370/221 |

FOREIGN PATENT DOCUMENTS

| | | |
|---|---|---|
| WO | WO-2012/048464 (A1) | 4/2012 |
| WO | WO-2014/089791 (A1) | 6/2014 |

OTHER PUBLICATIONS

"PCT Written Opinion of the International Preliminary Examining Authority," for Counterpart PCT Application No. PCT/SE2012/051391, mailed Dec. 15, 2014, 6 pages.

"Notification of Transmittal of the International Preliminary Report on Patentability," for Counterpart PCT Application No. PCT/SE2012/051391, mailed Mar. 6, 2015, 25 pages.

3GPP TS 36.213 v11.0.0: "Evolved Universal Terrestrial Radio Access (E-UTRA); Physical layer procedures," 3rd Generation Partnership Project, Technical Specification Group Radio Access Network (Release 11), (Sep. 2012), 143 pages.

Office Action, Japanese Application No. 2015-547890, mailed Jul. 29, 2016, 6 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 2

| U/D Ratio | UL/DL configuration | For PDSCH | | | | | | | | | | For PDSCH | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| 9:1 | 5 | | | 13,12,11,9,8,7,6,5,4 | | | | | | | | | | | | | | | | | | 9 |
| 8:2 | 2 | | | 8,7,6,4 | | | | | 8,7,6,4 | | | | | | 6 | | | | | 8 | | |
| 7:3 | 3 | | | 11,7,6 | 6,5 | 5,4 | | | | | | | 6 | | | | | | | 6 | 6 | 6 |
| 6:4 | 1 | | | 7,6 | 4 | | | | | 7,6 | 4 | | | 4 | | | 6 | | 4 | | 6 | 6 |
| 5:5 | 6 | | | 7 | 7 | 5 | | | | 7 | 7 | | 6 | 4 | | | 6 | 7 | 4 | | 6 | 6 |

Fig. 3

| D2D Pair ID | U/D Ratio | UL/DL config | Subframe No. | | | | | | | | | |
|---|---|---|---|---|---|---|---|---|---|---|---|---|
| | | | 0 | 1 | 2 | 3 | 4 | 5 | 6 | 7 | 8 | 9 |
| 1 | 9:1 | 5 | | | 13,12,11,<br>9,8,7,<br>6,5,4 | | | | | | | |
| 2 | 8:2 | 2 | 6 | | 8,7,6,4 | 6 | | | | 8,7,6,4 | 6 | 6 |
| 3 | 7:3 | 3 | | | 11,7,6 | 6,5 | 3,4 | | | | | |
| 4 | 6:4 | 1 | | 4 | 7,6 | 4 | 6 | | 4 | 7,6 | 4 | 6 |
| 5 | 5:5 | 6 | 6 | 4 | 7 | 7 | 5 | 7 | 4 | 7 | 7 | 6 |

| D2D Pair ID | U/D Ratio | UL/DL config | D2D-compatible Subframe No. | | | | | | | | | | |
|---|---|---|---|---|---|---|---|---|---|---|---|---|---|
| | | | 0 | 1 | 2 | 3 | 4 | 5 | 6 | 7 | 8 | 9 | |
| 1 | 9:1 | 5 | | | 4 on R1_1 | | | | | 6 on R1_1 | | |
| 2 | 8:2 | 2 | | | 8 on R4_2, 7 on R3_2, 6 on R2_2, 4 on R1_2 | 6 on R1_2 | | | | | 6 on R1_2 | |
| 3 | 7:3 | 3 | 6 on R1_3 | | 11 on R3_3, 7 on R2_3, 6 on R1_3 | 6 on R2_3, 5 on R1_3 | 5 on R2_3, 4 on R1_3 | | | | 6 on R1_3 | 6 on R1_3 |
| 4 | 6:4 | 1 | | 4 on R1_4 | 7 on R2_4, 6 on R1_4 | 4 on R1_4 | 6 on R1_4 | | 4 on R1_4 | 7 on R2_4, 6 on R1_4 | 6 on R1_4 | 6 on R1_4 |
| 5 | 5:5 | 6 | 6 on R1_5 | 4 on R1_5 | 7 on R1_5 | 7 on R1_5 | 5 on R1_5 | 7 on R1_5 | 4 on R1_5 | 7 on R2_5, 6 on R1_5 | 4 on R1_4, 7 on R1_5 | 6 on R1_5 |

Fig. 10

TECHNIQUES FOR ENABLING AND PERFORMING HARQ TRANSMISSIONS IN A D2D COMMUNICATION BETWEEN WIRELESS DEVICES IN A WIRELESS TELECOMMUNICATIONS NETWORK

CROSS-REFERENCE TO RELATED APPLICATIONS

This application is a National stage of International Application No. PCT/SE2012/051391, filed Dec. 14, 2012, which is hereby incorporated by reference.

TECHNICAL FIELD

Embodiments herein relate to Hybrid Automatic Repeat reQuest, HARQ, transmissions. In particular, embodiments herein relate to enabling and performing HARQ transmissions in a Device-to-Device, D2D, communication between wireless devices in a wireless communications network.

BACKGROUND

In wireless communication networks, recent developments of the 3GPP Long Term Evolution, LTE, facilitate accessing local IP based services in the home, the office, in public hot spot or even in outdoor environments. One area in which the access and local connectivity of these local IP based services may be used is in the direct communication between wireless devices in the close proximity of each other. In this case, close proximity may typically refer to less than a few tens of meters, but sometimes even up to a few hundred meters.

This direct mode or device-to-device, D2D, communication may demonstrate a number of potential gains over traditional cellular communication. This is because D2D devices are much closer to one another than other cellular devices that have to communicate via cellular access point, e.g. a radio network node such as an eNodeB.

One of these potential gains is capacity. Radio resources, such as, e.g. Orthogonal Frequency-Division Multiplexing, OFDM, resource blocks, between the D2D and cellular layers may be reused, resulting in reuse gains. Also, the D2D link uses a single hop between the transmitter and receiver points as opposed to the double-hop link via a cellular access point, resulting in hop gains.

Another potential gain is peak rate. Because of the proximity, and potentially favorable propagation conditions for the D2D link, high peak rates are possible to achieve, resulting in proximity gains.

A further potential gain is latency. When wireless devices communicate over a direct D2D link, forwarding via the cellular access point is short cut and the end-to-end latency between the wireless device may decrease.

In these mixed cellular and D2D wireless communication networks, it has been suggested to locate D2D communication on cellular uplink, UL, resources in a way such that Time-Division Duplex, TDD, is the duplex transmission scheme of the D2D communication. This means that the cellular UL resources would be allocated for D2D communication transmission in both upstream and downstream directions for each D2D pair of wireless devices in a Time-Division Multiplexed, TDM, manner.

As a consequence of this configuration, and as one of the key components of the physical and Medium Access Control, PHY/MAC, layer, a HARQ mechanism for the D2D communication has to be designed to take the following aspects into account.

First, HARQ transmission is coupled with a TDD configuration that is specific for the D2D communication. This means that the HARQ timing must fit for the chosen TDD configuration.

Secondly, on the one hand, the D2D TDD configuration is specific for each D2D pair. This means that each D2D pair will need to have its own HARQ timing and find the Dedicated Control CHannel Acknowledgement/Non-Acknowledgement, DCCH A/N, resource locally. This may e.g. be performed based on the Control Channel Element, CCE, index n_cce and the subframe index m according to 3GPP TS 36.213 E-UTRA Physical layer procedures 2011.03.

On the other hand, the DCCH resource allocation should be controlled from a network point of view in order to ensure that the resources are efficiently used. This may be referred to as network-assisted D2D communication.

Thirdly, the amount and location of available cellular UL resources for D2D transmission, i.e. D2D-compatible subframes in which D2D communication is allowed to be scheduled, would also be load dependent and thus time-varying. This will affect the amount or delay of the DCCH that is carrying the A/N for the D20 communication, i.e. a D2D control channel which is similar to the Physical Uplink Control CHannel A/N, PUCCH A/N, in LTE. Thus, it will also affect the HARQ timing.

In view of the above, there are numerous requirements to be considered when attempting to provide a HARQ transmission for a D2D communication between wireless devices.

US 20120163252A1 relates to the problem of HARQ mechanism in D2D communication. Here, the ratio of the upstream and down-stream cellular UL resources for the D2D link is fixed to a 1:1 ratio. This limits the D2D communication to only apply to a single case, and thus is too limited to be applied to different upstream and downstream ratio scenarios in D2D communication.

SUMMARY

It is an object of embodiments herein to provide a HARQ transmission for D2D communication between wireless devices applicable to different upstream and downstream ratio scenarios.

According to a first aspect of embodiments herein, the object is achieved by a method performed by a network node for enabling Hybrid Automatic Repeat reQuest, HARQ, transmissions in a D2D communication between a first and a second wireless device in a wireless telecommunications network. The first and second wireless device is served by the network node in the wireless telecommunications network. The network node transmits information to at least the first and second wireless device indicating transmission resources to be used by at least the first and second wireless device when transmitting a HARQ transmission for a received data transmission in the D2D communication, which information is associated with one or more Time-Division Duplexing, TDD, configurations. Then, the network node determines a TDD configuration of the one or more TDD configurations for data transmissions in the D2D communication between the first and the second wireless device. The network node transmits the determined TDD configuration to the first and second wireless device.

According to a second aspect of embodiments herein, the object is achieved by a network node for enabling Hybrid Automatic Repeat reQuest, HARQ, transmissions in a D2D communication between a first and a second wireless device in a wireless telecommunications network. The first and second wireless device is served by the network node in the wireless telecommunications network. The network node comprises transceiving unit configured to transmit information to at least the first and second wireless device indicating transmission resources to be used by at least the first and second wireless device, when transmitting a HARQ transmission for a received data transmission in the D2D communication, in accordance with one or more Time-Division Duplexing, TDD, configurations. The network node also comprises a determining unit configured to determine a TDD configuration of the one or more TDD configurations for data transmissions in the D2D communication between the first and the second wireless device. The transceiving unit is further configured to transmit the determined TDD configuration to the first and second wireless device.

According to a third aspect of embodiments herein, the object is achieved by a method performed by a first wireless device for performing Hybrid Automatic Repeat reQuest, HARQ, transmissions in a D2D communication with a second wireless device in a wireless telecommunications network. The first and second wireless device is served by a network node in the wireless telecommunications network. The first wireless device receives information from the network node indicating transmission resources to be used by the first wireless device when transmitting a HARQ transmission to the second wireless device for a received data transmission in the D2D communication, in accordance with one or more Time-Division Duplexing, TDD, configurations. Also, the first wireless device receives a TDD configuration of the one or more TDD configurations from the network node for data transmissions in the D2D communication with the second wireless device. Further, the first wireless device determines a HARQ transmission timing for received data transmissions in the D2D communication based on the received TDD configuration. The first wireless device also determines transmission resources to be used when transmitting a HARQ transmission for received data transmissions in the D2D communication based on the received information indicating the transmission resources and the determined HARQ transmission timing. Then, the first wireless device transmits a HARQ transmission on the determined transmission resources to the second wireless device in response to receiving a data transmission from the second wireless device in the D2D communication.

According to a fourth aspect of embodiments herein, the object is achieved by a first wireless device for performing Hybrid Automatic Repeat reQuest, HARQ, transmissions in a D2D communication with a second wireless device in a wireless telecommunications network. The first and second wireless device is served by a network node in the wireless telecommunications network. The first wireless device comprises a transceiving unit configured to receive information from the network node indicating transmission resources to be used by the first wireless device, when transmitting a HARQ transmission to the second wireless device for a received data transmission in the D2D communication, in accordance with one or more Time-Division Duplexing, TDD, configurations, and to receive a TDD configuration of the one or more TDD configurations from the network node for data transmissions in the D2D communication with the second wireless device. The first wireless device also comprises a determining unit configured to determine a HARQ transmission timing for received data transmissions in the D2D communication based on the received TDD configuration, and to determine transmission resources to be used when transmitting a HARQ transmission for received data transmissions in the D2D communication based on the received information indicating the transmission resources and the determined HARQ transmission timing. The transceiving unit is further configured to transmit a HARQ transmission on the determined transmission resources to the second wireless device in response to receiving a data transmission from the second wireless device in the D2D communication.

By transmitting HARQ transmission information associated with different TDD configurations and a determined TDD configuration for a D2D pair of wireless devices, the network node enables one of the wireless devices in the D2D pair to determine a HARQ timing and transmission resources in response to receiving a data transmission from the other wireless device in the D2D communication, which will not result in collisions with other HARQ transmissions between other D2D pairs of wireless devices.

This is may be performed regardless of which upstream and downstream ratio scenario that is applied in the TDD configuration.

Hence, a HARQ transmission for D2D communication between wireless devices applicable to different upstream and downstream ratio scenarios is provided.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 2 is a schematic table illustrating different TDD configurations.

FIG. 3 is a schematic table illustrating HARQ timing for different TDD configurations.

FIG. 5 is a schematic table illustrating TDD configurations for D2D pairs of wireless device.

FIG. 10 is a schematic illustration depicting HARQ timing and location separation information used in embodiments of the method in the network node.

DETAILED DESCRIPTION

Figure 1:
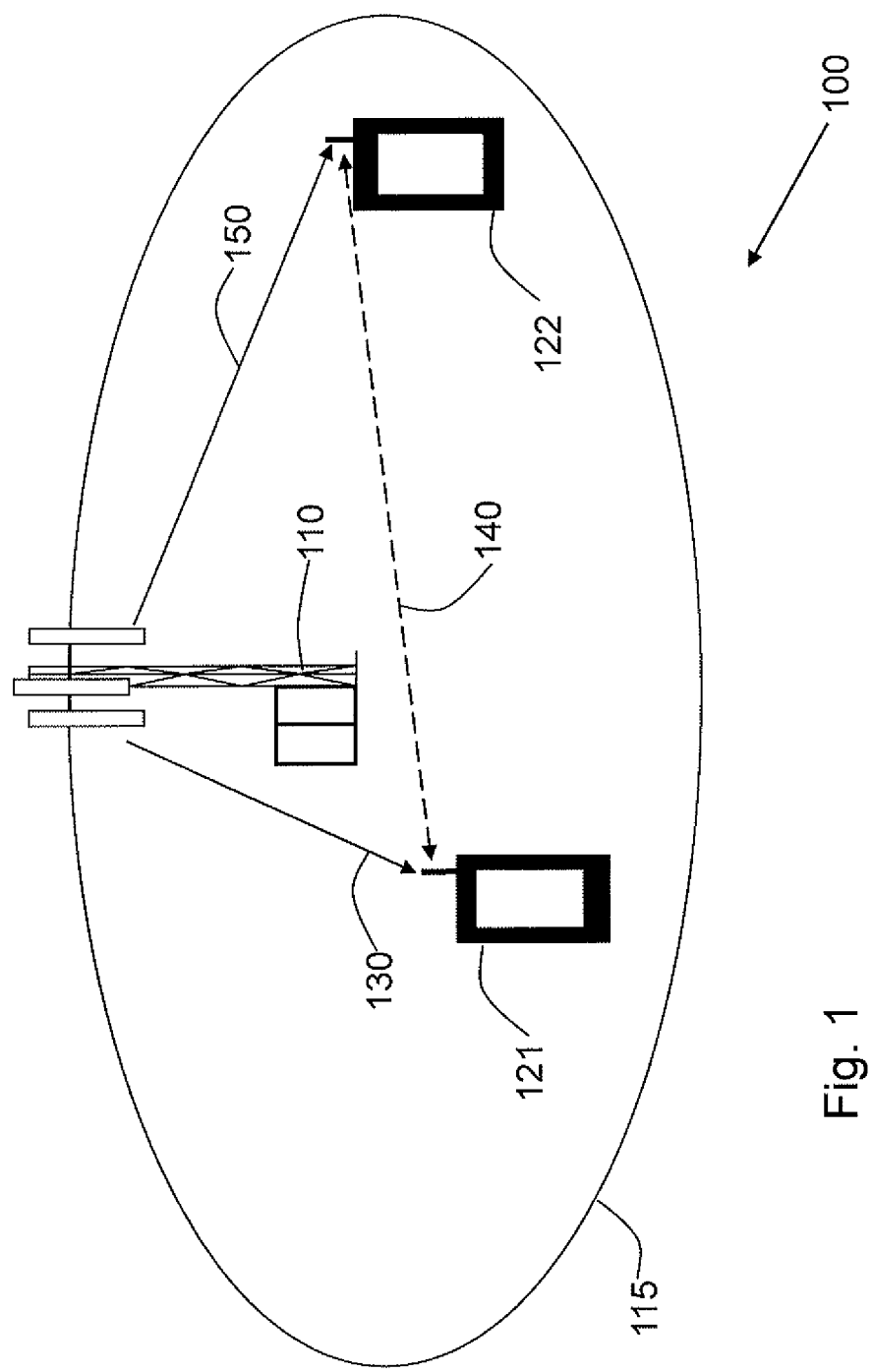
FIG. 1 is a schematic illustration of a network node and wireless devices in a wireless telecommunications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless telecommunications network 100 in which embodiments herein may be implemented. In some embodiments the wireless telecommunications network 100 may be a wireless telecommunication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

The wireless telecommunications system 100 comprises a radio network node 110 which is a base station and is therefore also is referred to as the base station 110. The radio network node 110 serves a cell 115. The radio network node 110 may in this example e.g. be an eNB, eNodeB, or a Home Node B, a Home eNode B, femto Base Station (BS), pico BS or any other network unit capable to serve a wireless device or a machine type communication device in a wireless telecommunications system.

A first wireless device 121 is located within the cell 115. The wireless device 121 is configured to communicate within the wireless communications system 102 via the radio network node 110 over a radio link 130 when the first wireless device 121 is present in the cell 115 served by the base station 110. The first wireless device 121 is capable of communicate with other wireless devices such as a second wireless device 122 to be described below, or devices using wireless D2D communication over a D2D link 140.

In this example, the second wireless device 122 is also located within the cell 115. However, in other embodiments, the second wireless device 122 may be located in another cell which is adjacent to the cell 115. The second wireless device 122 is configured to communicate within the wireless communications system 100 via the radio network node 110 over a radio link such as e.g. a radio link 150 when the second wireless device 122 is present in the cell 115 served by the base station 110. The second wireless device 122 is capable of communicating with other wireless devices such as the first wireless device 121 using wireless D2D communication over the D2D link 140.

It should be noted that the first wireless device 121 and the second wireless device 122 may e.g. be user equipments, e.g. be mobile terminals or wireless terminals, mobile phones, computers such as e.g. laptops, Personal Digital Assistants (PDAs) or tablet computers, sometimes referred to as surf plates, with wireless capability, Machine to Machine (M2M) devices or any other radio network units capable to communicate over a radio link in a communications network.

It should also be noted that a large number of wireless devices may be located in the communications network 100.

The first and second wireless device 121, 122 may be seen as one D2D pair of wireless devices among many more D2D pairs of wireless devices.

As part of the developing of the embodiments described herein, a problem will first be identified and discussed with reference to FIGS. 2-6. First, the HARQ mechanism is described for a wireless telecommunication network. Secondly, a problem with implementing a HARQ mechanism for D2D communication between wireless devices in the wireless telecommunication network is identified and discussed.

FIG. 2 is a schematic table illustrating different TDD configurations, also referred to as Uplink-Downlink configurations.

FIG. 2 shows seven (7) different TDD configurations as currently defined in the 3GPP LTE specification for a wireless telecommunication network, such as, e.g. the wireless telecommunication network 100. In FIG. 2, a subframe used for downlink is denoted with a "D" and a subframe used for uplink is denoted with a "U". Also, "S" denotes special subframes for switching between downlink and uplink. These 7 different TDD configurations are broadcasted in System Information Blocks, SIB, and implements different downlink/uplink, D/U, ratio cases, i.e. from 9:1 to 5:5.

For each of these TDD configurations, HARQ timing and resources on the Physical Uplink Control CHannel, PUCCH, used to carry the HARQ A/N are specified respectively.

FIG. 3 is a schematic table illustrating HARQ timing for different TDD configurations. The table in FIG. 3 shows the value of l, which means the HARQ A/N sent on the PUCCH in the n-th subframe is in response to the Physical Downlink Shared CHannel/Physical Downlink Shared CHannel, PDSCH/PUSCH, data transmission sent in the (n−l)-th subframe.

For the resources on the PUCCH used to carry the HARQ A/N, the wireless device may calculate the resource location, i.e. PUCCH resource index, based on the location, n_cce, of the Physical Uplink Control Channel, PDCCH, Control Channel Element, CCE, and the subframe offset m. This may be performed such that the HARQ A/N for Physical Resource Blocks, PRBs, scheduled by different PDCCHs, or in different subframes, does not collide with each other.

For example, in 3GPP TS 36.213 E-UTRA Physical layer procedures 2011.03, this is performed according to the following:

"The UE first selects a c value out of $\{0, 1, 2, 3\}$ which makes $N_c \le n_{CCE} \le N_{c+1}$ and shall use $n_{PUCCH}^{(1,\tilde{p}=p_0)} = (M-m-1)\cdot N_c + m\cdot N_{c+1} + n_{CCE} + N_{PUCCH}^{(1)}$ for antenna port $p=p_0$, where $N_{PUCCH}^{(1)}$ is configured by higher layers, $N_c = \max\{0, \lfloor [N_{RB}^{DL} \cdot (N_{sc}^{RB} \cdot c - 4)]/36 \rfloor\}$, and $n_{CCE}$ is the number of the first CCE used for transmission of the corresponding PDCCH."

Figure 4:
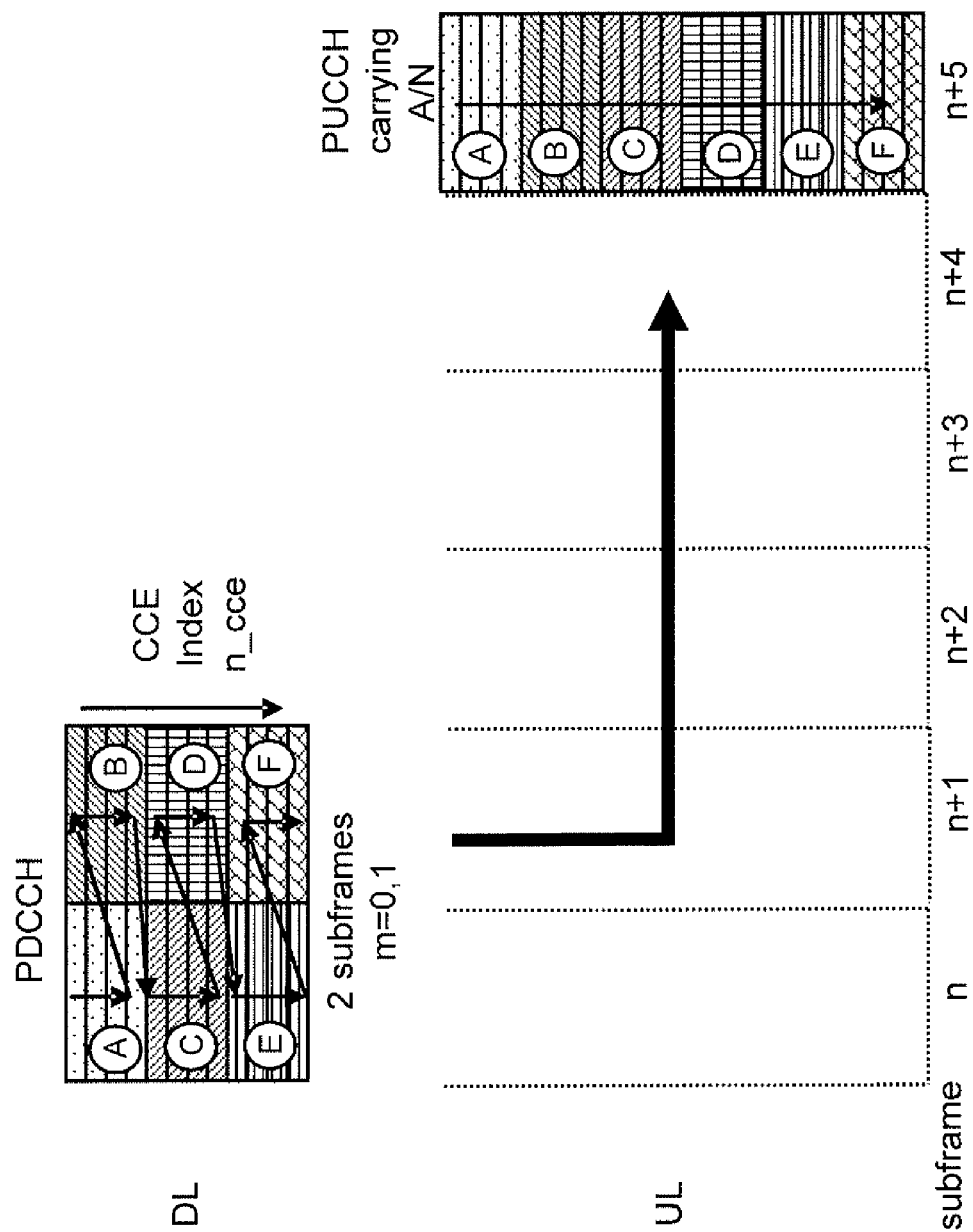
FIG. 4 is a schematic illustration of a PDCCH CCE to PUCCH resource index mapping.

This means that the PDCCH CCE to PUCCH resource index mapping for the HARQ A/N may be illustrated as seen in FIG. 4.

In FIG. 4, the mapping for the PDCCH CCE (denoted A-F in FIG. 4) to PUCCH resource index (e.g. subframe n+5 in FIG. 4) is performed in an interleaving-type way to mix the HARQ A/N for different subframes together. It should be noted that the subframe offset m, the PDCCH CCE location n_cce, and interleaving granularity shown in FIG. 4 are mere examples and may be extended to other values.

In this way, since all wireless devices in the serving cell, e.g. the cell 115, have the same TDD configuration and knowing the TDD configuration in the serving cell from the SIB, all wireless devices in the serving cell will follow the defined HARQ timing and calculate the PUCCH A/N resource location for the HARQ A/N accordingly in the same manner, i.e. as shown above.

However, compared to the HARQ mechanism described for above for wireless telecommunication network, implementing a similar HARQ mechanism for D2D communication between wireless devices in a wireless telecommunication network will cause problems.

First, the TDD configuration for D2D communication between the wireless devices is not cell-specific as described above for the wireless telecommunication network. Instead, the TDD configuration for D2D communication between the wireless devices is specific for each D2D pair of wireless device. This is illustrated in the table of FIG. 5.

FIG. 5 shows five (5) different D2D pairs having 5 different TDD configurations. The table shows the value of l, which means the HARQ A/N on the DCCH in n-th subframe would be in response to the D2D data transmission in (n–l)-th subframe.

It should be noted that the DCCH is used here to carry the HARQ A/N, which is similar to PUCCH in the cellular-only wireless telecommunication network. Here, this is performed if no D2D data transmission is in the same subframe. Otherwise, an in-band HARQ A/N format may be used, i.e. the HARQ A/N may be transmitted with D2D data together on a D2D Shared CHannel, DSCH, which is used to carry D2D data transmissions. This is similar to the use of uplink control information, UCI, sent on PUSCH in 3GPP LTE. The advantage for DCCH is here similar to the advantage for PUCCH, which is the resource efficiency when carrying small size of bits, such as, A/N information. This table is an extension of the existing TDD configuration in the cellular-only wireless telecommunication network described above in reference to FIGS. 2-4.

Also, in FIG. 5, the two different transmission directions of each D2D link, i.e. upstream and downstream direction, is denoted by the dotted and dashed fields, respectively, in the table.

However, by having D2D wireless device specific TDD configurations, each D2D pair of wireless devices will be blind to the TDD configurations of other D2D pairs of wireless devices.

It has been identified that by being blind to the TDD configurations of other D2D pairs of wireless devices, the traditional HARQ A/N resource calculation scheme in the wireless devices will cause collisions in the HARQ transmissions for the different D2D pairs of wireless devices engaged in D2D communication.

Figure 6:
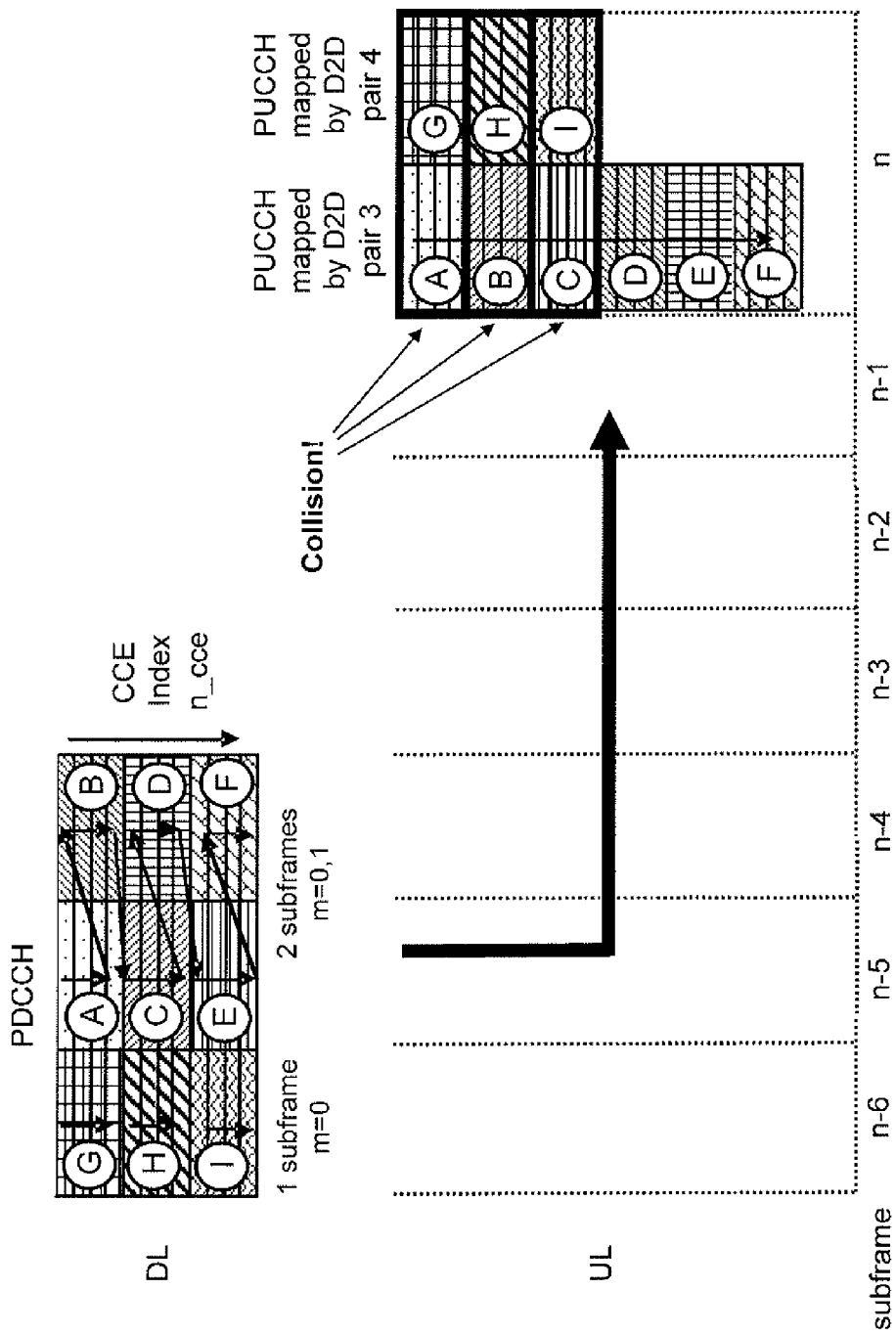
FIG. 6 is a schematic illustration of a collision scenario in a PDCCH CCE to PUCCH resource index mapping between two D2D pairs of wireless device with different TDD configurations.

One example of this is shown by the marked field 150 in FIG. 5. Here, the D2D pair 3 and 4 of wireless devices, on subframe 4, according to the table, is to provide HARQ A/N for different subframe sets, i.e. the D2D pair 3 of wireless devices for subframe n–5, n–4; and the D2D pair 4 of wireless devices for subframe n–6. As shown in FIG. 6, for the two D2D pairs 3 and 4 of wireless devices with different TDD configurations, the calculated HARQ A/N resources for the different subframe sets of the D2D pair 3 and 4 of wireless devices may be located at a colliding PUCCH index.

This is seen in FIG. 6 since for D2D pair 3 of wireless devices, the subframes n–5, n–4 are taken since the subframe offset is m=0, 1; while for D2D pair 4 of wireless device, the subframe n–6 is taken as the subframe offset is m=0. Thus, in this example, the location of the HARQ A/N resources for subframe set A-C of the D2D pair 3 of wireless devices, and the location of the HARQ A/N resources for subframe set G-I of the D2D pair 4 of wireless devices are colliding.

This kind of DCCH collision is not wanted, since the HARQ A/Ns carried on the DCCH are in response to different DSCH resource locations on different subframes. Therefore, how to coordinate DCCH resources carrying HARQ A/Ns for D2D communication between the wireless devices to avoid this collision is one problem.

It should be noted that, in FIG. 6, the notation PDCCH for the DSCH and PUCCH for the DCCH is kept for the sake of clarity in respect to the implementation in the cellular-only wireless telecommunication network.

This problem is addressed by the embodiments described herein by transmitting HARQ transmission information associated with different TDD configurations to at least the D2D pair of wireless devices 121, 122 and transmitting a determined TDD configuration for the D2D pair of wireless devices 121, 122 to the D2D pair of wireless devices 121, 122, the network node 110 enables one of the wireless devices 121, 122 in the D2D pair to determine a HARQ timing and transmission resources in response to receiving a data transmission from the other wireless device 121, 122 in the D2D communication which will not result in collisions with other HARQ transmissions between other D2D pairs of wireless devices. This is may be performed regardless of which upstream and downstream ratio scenario that is applied in the TDD configuration.

Figure 7:
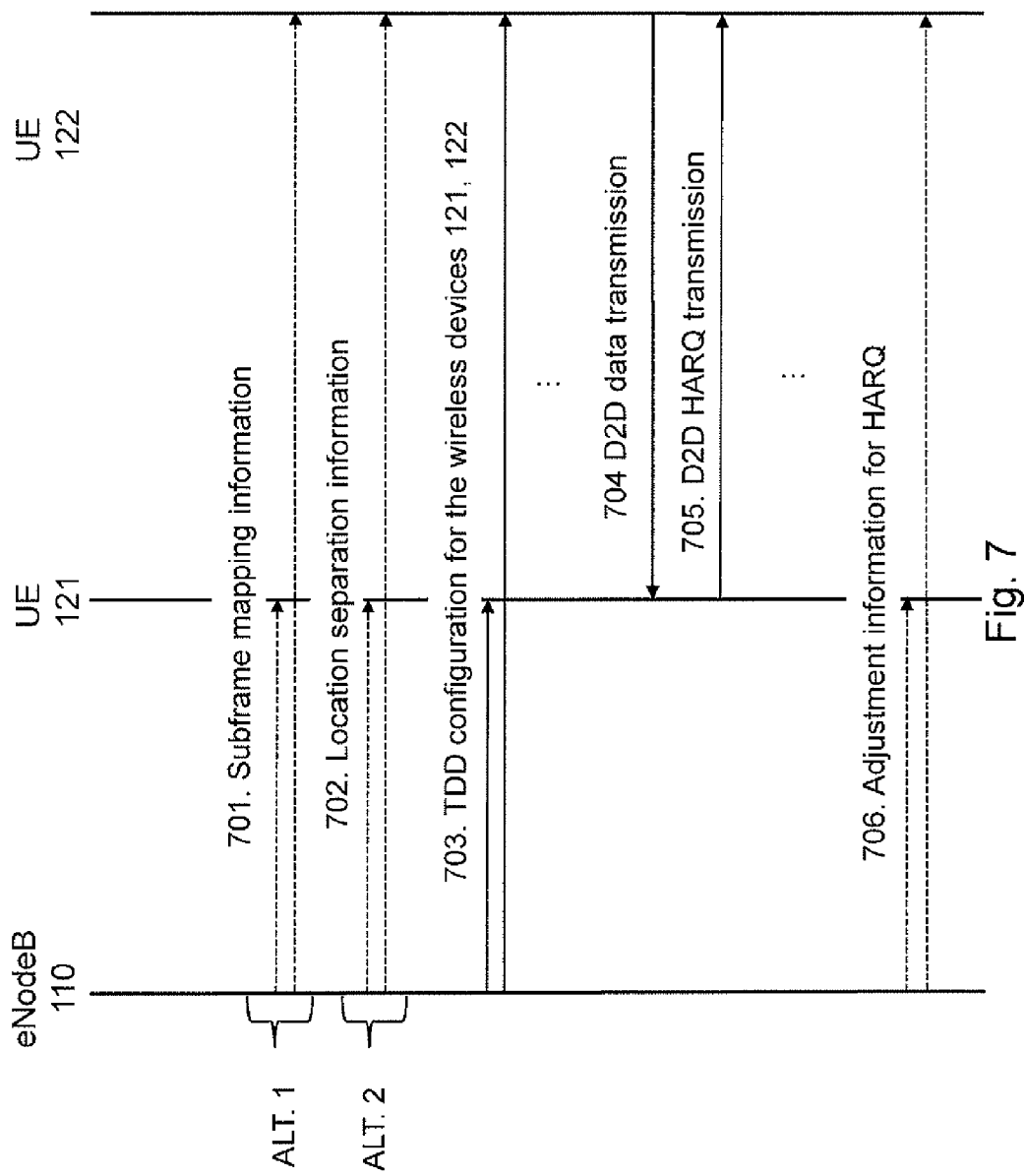
FIG. 7 is a signal flow diagram depicting embodiments of the methods in the network node and the first wireless device.

FIG. 7 is a signal flow diagram depicting embodiments of the methods in the network node 110 and the first wireless device 121.

As previously mentioned when applying the HARQ mechanism in the wireless telecommunication network 100, all wireless devices 121, 122 in the same cell 115 will have the same TDD configuration. This means that all wireless devices 121, 122 will apply the same resource mapping scheme for the HARQ A/N on the PUUCH to the network node 110, such that HARQ A/N resource collisions on the PUCCH may be avoided for all wireless device 121, 122.

Specifically, as shown in FIG. 4, the calculation of the PUCCH resource location for the HARQ A/N is based on both the PDCCH CCE number n_cce and subframe offset m, such that the HARQ A/N feedback for different PRB locations or different subframes on the PUCCH will be separated from each other and thus will not cause a collision. However, in D2D communication, the different D2D pairs of wireless devices in the cell 15, such as, e.g. the first and second wireless device 121, 122, will use different TDD configurations. This means that they will apply different resource mapping schemes for the HARQ A/N on the DCCH.

As shown in FIG. 6, this may cause resource collision on the DCCH (denoted PUCCH in FIG. 6 for the sake of clarity in comparison to the example in FIG. 4) between different D2D pairs of wireless devices.

In order to avoid such resource collisions, the network node 110 sends information to at least the first and second wireless device 121,122 indicating transmission resources to be used by at least the first and second wireless device 121,122 when transmitting a HARQ transmission for a received data transmission in a D2D communication. This information is associated with one or more TDD configurations, i.e. this information may indicate to the first and second wireless device 121,122 which HARQ A/N resource location on the DCCH to use for which TDD configuration.

This signalling by the network node 110 may be carried in different forms, e.g. as broadcast or a dedicated signalling. The signalling by the network node 110 may also be performed by using Downlink Control Information, DCI, signaling, Media Access Control CE, MAC CE, signaling, or Radio Resource Control, RRC, signaling.

The information sent by the network node, i.e. content of the signalling, may also be different, e.g. the information may be subframe mapping information as described below in Action 701, or alternatively the information may be location separation information as described in Action 702. Both alternatives are shown by dashed arrows in FIG. 7 and are denoted as "Alt. 1" and "Alt. 2", respectively.

Action 701. In this action, the information transmitted by the network node 110 is subframe mapping information. This information is common for all TDD configurations and specific for each D2D compatible subframe. Also, the subframe mapping information may be transmitted to all wireless devices being served by the network node 110, i.e. all wireless device in the cell 15, and not only to the first and second wireless device 121,122. Further, the subframe mapping information may also be referred to as e.g. m-value based DCCH HARQ A/N resource indications or m-subframe mapping information for D2D communications. Here, m is the subframe offset or subframe offset value.

The subframe mapping information may be used by each wireless device, such as, the first and second wireless device 121,122, to locally derive the DCCH resource index for the HARQ A/N, i.e. the resource location on the DCCH for the HARQ A/N.

Figure 8:
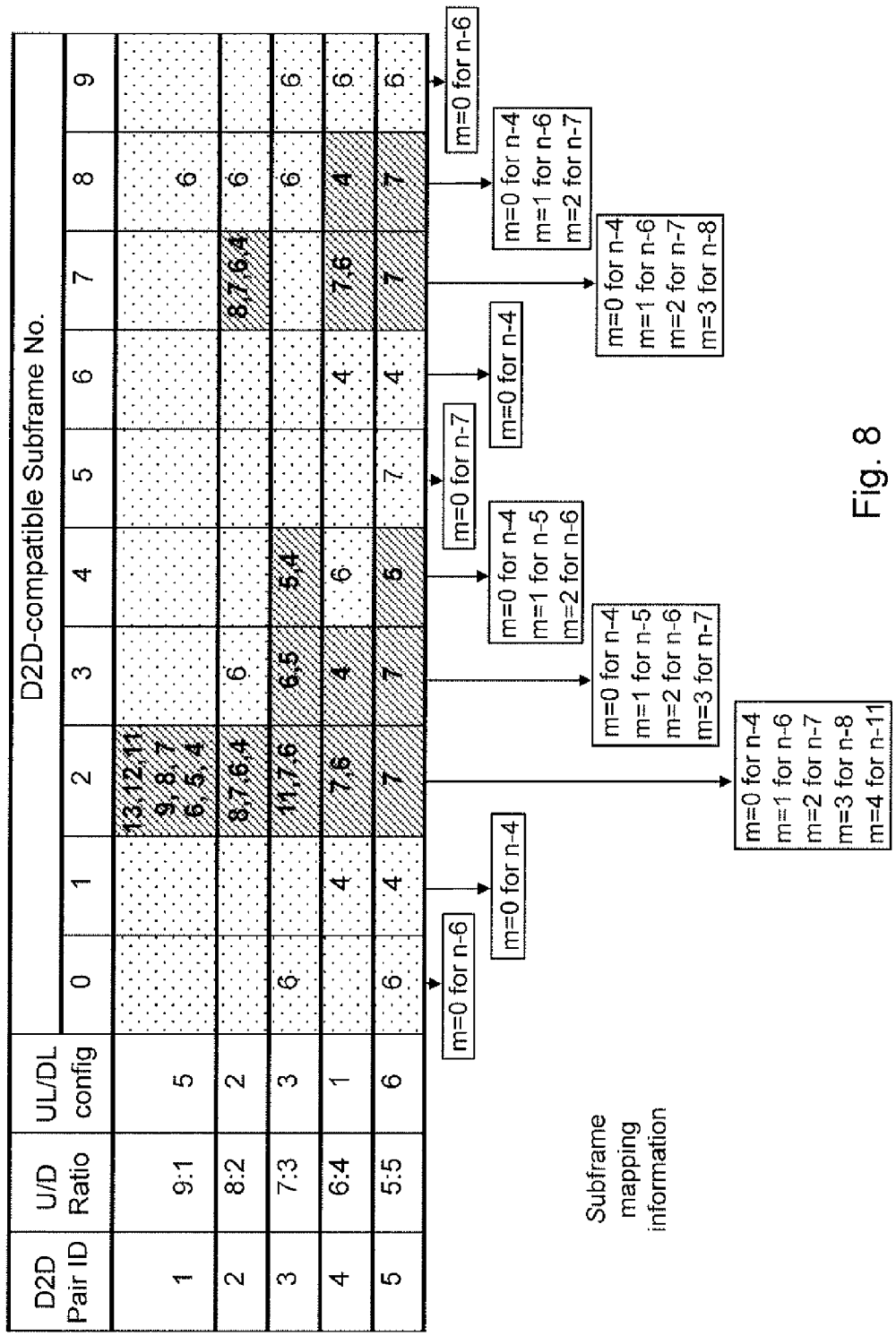
FIG. 8 is a schematic illustration depicting HARQ timing and subframe mapping information used in embodiments of the method in the network node.

FIG. 8 depicts a table illustrating an example of the HARQ timing and subframe mapping information for D2D communication. In the table, the HARQ timing and subframe mapping information is shown for each TDD configuration and each D2D compatible subframe.

Similar to the definition in 3GPP LTE, a common m-value for the wireless devices may be sent to all wireless devices, which all may apply different TDD configurations in the D2D communication within in their respective D2D pair of wireless devices. Thus, as shown by the table in FIG. 8, all wireless devices in D2D communication, such as, the first and second wireless device 121,122, may use this common value of m to calculate HARQ A/N resource location on the DCCH when responding to a received data transmission from its counterpart; this in order to avoid collision on the DCCH with other D2D pairs of wireless devices in the cell 15.

Hence, for example, for both D2D pairs 3 and 4, the wireless devices would calculate the DCCH resources location by m=0 for n−6 subframe, m=1 for n−5 subframe, and m=2 for n−4 subframe.

It may also be noted that for the TDD configuration 5, i.e. D/U ratio 9:1, no A/N multiplexing would be used. Instead, the A/N for different subframes would be bundled, and thus only one DCCH resource is required. This may be performed in order to save A/N feedback resources. This is similar to the HARQ mechanism in the wireless telecommunication network 100 according to 3GPP TS 36.213 E-UTRA Physical layer procedures 2011.03.

Figure 9:
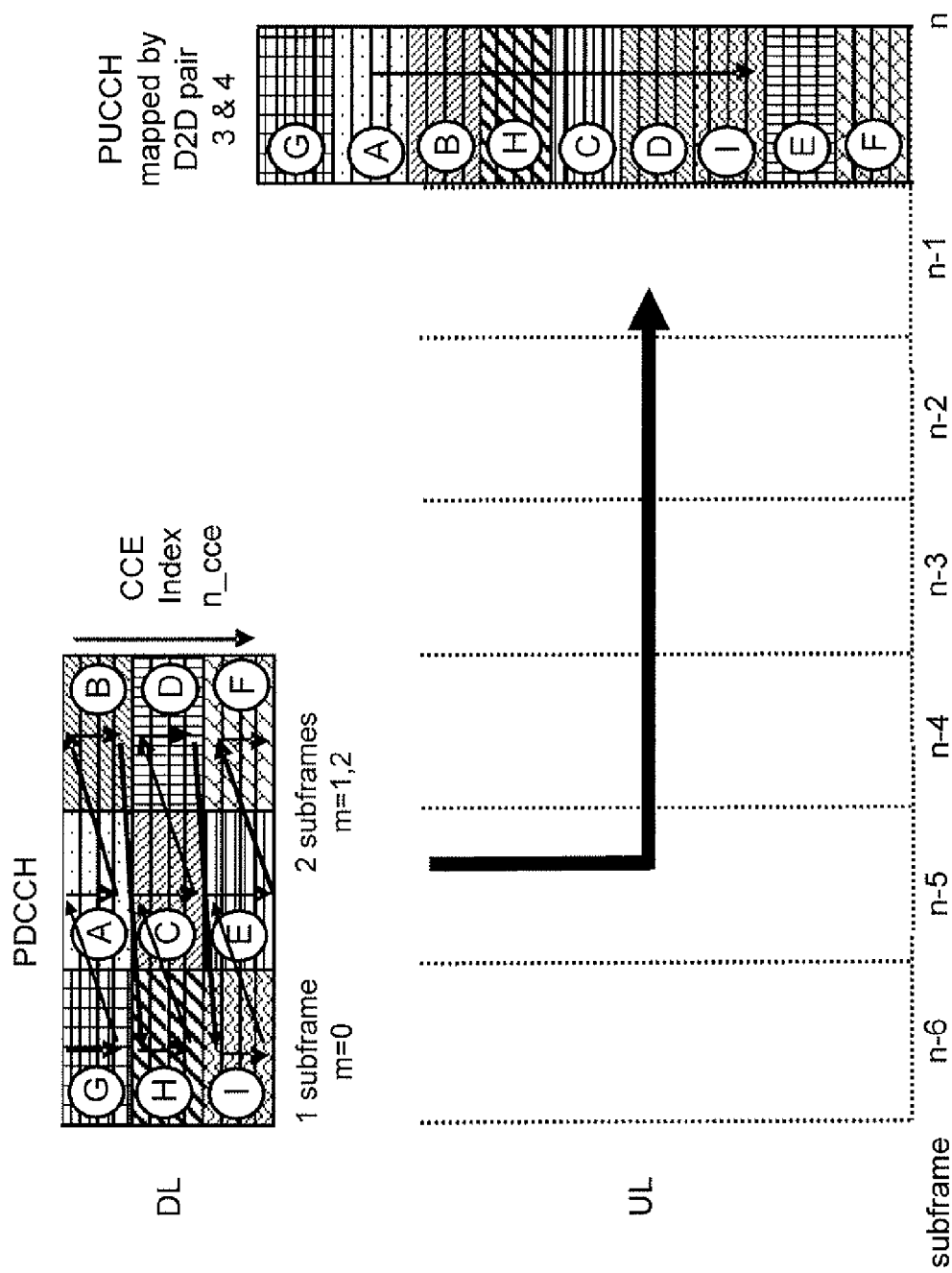
FIG. 9 is a schematic illustration of a PDCCH CCE to PUCCH resource index mapping between two D2D pairs of wireless device with different TDD configurations without collisions according to embodiments of the method in the network node.

This will result in a collision-free HARQ transmission as shown by the example depicted in FIG. 9. Here, it may be seen that the resource collision on the DCCH (denoted PUCCH in FIG. 9) between the D2D pairs 3 and 4 of wireless devices is avoided, i.e. the location of the HARQ A/N resources for subframe set A-F of the D2D pair 3 of wireless devices and the location of the HARQ A/N resources for subframe set G-I of the D2D pair 4 of wireless devices are not colliding.

Action 702. In this action, the information transmitted by the network node 110 is location separation information of the transmission resources used for HARQ, e.g. the information may indicate a separation in the DCCH resource index for the HARQ A/N, i.e. the resource location on the DCCH for the HARQ A/N. Further, the location separation information may also be referred to as wireless device specific HARQ A/N resource location separation for the DCCH in D2D communication.

The location separation information is specific for all wireless devices, such as, for each of the first and second wireless device 121, 122. Also, the separation information specific for each wireless device may be send separately to each of the wireless devices, such as, the first and second wireless device 121, 122.

This location separation information is configured such that the locations of the transmission resources used for HARQ are orthogonal to each other. This configuration may be semi-static in terms of the resource locations on the DCCH for different wireless devices, such as, e.g. 4 DCCH resources for different wireless devices x may be R1_x, R2_x, R3_x, R4_x, which all may be (pseudo-) orthogonal to each other. In this way, resource collisions are avoided between the wireless devices.

FIG. 10 depicts a table illustrating an example of the HARQ timing and location separation information for D2D communication. In the table, the HARQ timing and location separation information is shown for each TDD configuration and each D2D compatible subframe.

Here, the available HARQ A/N resource on the DCCH of R1_x, R2_x, R3_x, R4_x are sent by the network node 110 to each wireless device, such as, the first and second wireless device 121, 122, individually.

Hence, for example, on subframe 0, for D2D pair 3 of wireless devices, the wireless devices would calculate the HARQ A/N resource location on the DCCH as R1_3 for a single subframe, i.e. the n−6 subframe. On subframe 4, for D2D pair 3 of wireless devices, the wireless devices would calculate the HARQ A/N resource location on the DCCH as R1_3 and R2_3 for two subframes, i.e. the n−4 subframe and the n−5 subframe, respectively.

This will lead to a similar collision-free HARQ transmission such as that shown for the subframe mapping information in FIG. 9.

It should be noted that one TDD configuration for each upstream and downstream ratio is enough, and that the ratio of a:b is the same as the ratio of b:a, i.e. the network node 110 simply needs to schedule the first and second wireless devices 121, 122 in the opposite manner.

Action 703. In this action, the network node 110 determines a TDD configuration for data transmissions in the D2D communication between the first and the second wireless device 121,122, and transmits the determined TDD configuration to the first and second wireless device 121, 122.

The determination of the TDD configuration for the data transmissions in the D2D communication between the first and the second wireless device 121,122 may be based on one or more properties of a data transmission that is to be performed in the D2D communication between the first and second wireless device 121,122. The one or more properties may be e.g. the data traffic ratio or the channel quality of the D2D link 140 between the first and second wireless device 121,122.

For the data traffic ratio, the TDD configuration may be obtained by the network node 110 by e.g. inspecting the data flow, either by a core network entity, such as, e.g. a Packet data network Gateway, PGW, or by the network node 110 directly, e.g. by Deep Packet Inspection, DPI, technology.

For the channel quality, the TDD configuration may be obtained by the network node 110 e.g. based on a reference signal for UL and based on Channel Quality Indication, CQI, for DL. This TDD configuration decision procedure by network node 110 may be based on existing signaling and thus requires no extra signaling.

Action 704. In this action, the first wireless device 121 receives a D2D data transmission over the D2D link 140 from the second wireless device 122.

Action 705. By having received the information from the network node 110 indicating the determined TDD configuration for data transmissions in the D2D communication with the second wireless device 122, the first wireless device 121 may determine the HARQ timing for received data transmission based on the received TDD configuration. By having received the information from the network node 110 indicating transmission resources to be used by the first wireless device 121 when transmitting a HARQ transmission to the second wireless device 122 for a received data transmission in the D2D communication, the first wireless device 121 may determine the transmission resources to be used when transmitting a HARQ transmission for received data transmissions in the D2D communication based on the received information and the determined HARQ transmission timing. This may either be performed as described in Action 701 or Action 702.

Thus, the first wireless device 121 may in this action transmit a HARQ transmission on the determined transmission resources to the second wireless device 121.

Action 706. In this optional action, the network node 110 may transmit adjustment information for HARQ transmission to the first and second wireless device 121, 122.

In some embodiments, the adjustment information may be delay adjustment information for the HARQ timing based on the determined TDD configuration in Action 703. Alternatively, this delay adjustment information may be set, i.e. pre-defined or already determined, in the first and second wireless device 121, 122.

This may be because the time-varying amount and location of available cellular UL resources for the D2D communication, i.e. D2D compatible subframes, has an effect on the HARQ timing. Thus, the HARQ timing for each specific TDD configuration may need to be further tuned in order to balance the HARQ A/N overhead and to reduce HARQ latency.

It should be noted that the D2D compatible subframes are just a part of the total cellular UL resources, i.e. the cellular UL resources may be divided for cellular-only subframes and D2D-compatible subframes in a TDM manner.

Figure 11:
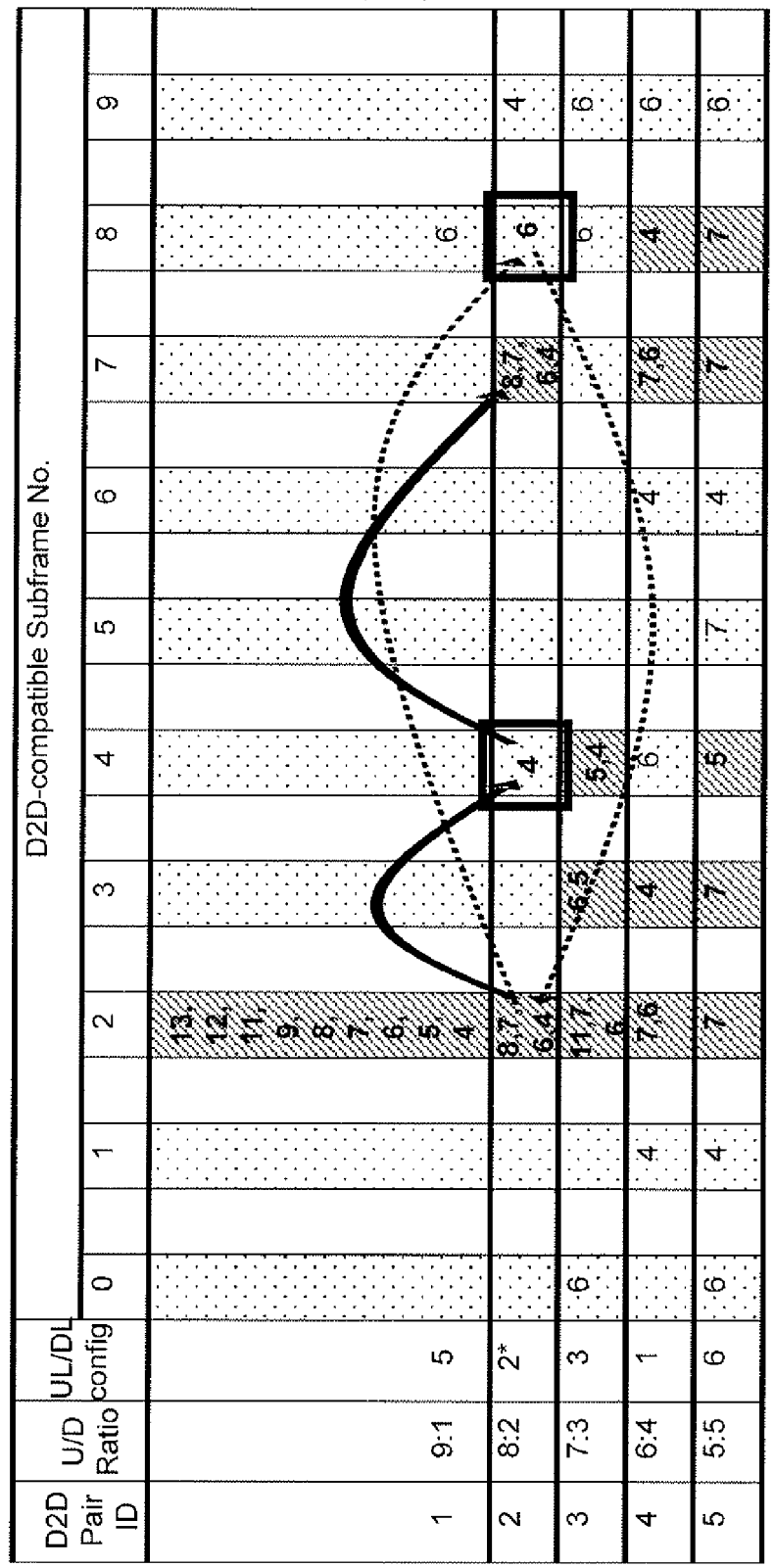
FIG. 11 is a schematic illustration depicting a delay timing adjustment in embodiments of the method in the network node.

FIG. 11 depicts an example of the delay timing adjustment. In the table, the HARQ timing is shown for each TDD configuration and each D2D compatible subframe. Also, in this case, the D2D compatible subframes are shown together with the cellular-only subframes illustrating an example of the total cellular UL resources in accordance with a particular subframe configuration.

In comparison with the table in FIG. 8, it has been found that the dashed subframe corresponding to the dashed subframe 1101 in FIG. 11, i.e. the $2^{nd}$ subframe for the D2D pair 2 of wireless device in FIG. 8, has to wait six (6) D2D compatible subframes for the HARQ A/N feedback transmission according to the table in FIG. 8; and, thus, also ten (10) D2D compatible subframes for retransmission.

However, in the table in FIG. 11, where the in-between cellular-only subframes create an extra delay, the HARQ timing may be further revised or tuned. The dashed arrow shows the case without the revision or tuning, i.e. the data transmission in subframe 2 would be feedback by HARQ A/N on DCCH in subframe 8, and may only re-transmit in the next subframe 2 if NACK is received. Considering the cellular-only subframes in-between, however, it can be revised or tuned as the solid arrow, i.e. the data transmission in subframe 2 would be feedback by HARQ A/N on DCCH in subframe 4, and may re-transmit in subframe 7 if NACK is received. Thus, the dashed subframe 1101 just has to wait two (2) D2D compatible subframes, or four (4) cellular-only and D2D compatible subframes, before the HARQ A/N feedback transmission, and four (5) cellular-only and D2D compatible subframes for retransmission.

Hence, the delay adjustment information may be configured to adjust the HARQ timing accordingly as shown in FIG. 11.

This delay adjustment information may further be based on a change of the D2D compatible subframes for data transmissions in the D2D communication between the first and second wireless device 121,122, as explained below.

One example of such a change is a transition from having one-out-of-two subframes being a D2D compatible subframe, i.e. a subframe sequence "DCDCDCDC" where "D" denote D2D compatible subframes and "C" denote cellular only subframes, to one-out-of-four subframes being a D2D compatible subframe, i.e. a subframe sequence "DCCCDCCC". This means that the different time interval, e.g. from 2 ms to 4 ms, between adjacent D2D compatible subframes automatically provides different delays in preparing the HARQ A/N feedback transmission and retransmission. For example, 2 ms may not be enough to perform the HARQ A/N feedback transmission, but 4 ms may be enough. As mentioned earlier, this may cause different HARQ timing calculation results.

Furthermore, even for the same ratio of D2D compatible subframes, such e.g. a ratio of 3/8, there could be different D2D compatible subframes location, such as, e.g. "DDDCCCCC" or "DCDCDCCC".

The delay adjustment information may therefore be configured to handle these different types of changes in the HARQ timing.

Since this TDM division of the total cellular UL resources could be various and in order for the first and second wireless device 121,122 to derive HARQ A/N resource location on the DCCH, the network node 110 also may transmit a D2D subframe configuration to the first and second wireless device 121,122. This may be performed prior to any of the Actions 701-705. The D2D subframe configuration specifies the D2D compatible subframes in which the first and second wireless device 121, 122 are allowed to schedule data transmissions in the D2D communication. This signalling by the network node 110 may also be carried in different forms, e.g. as broadcast or a dedicated signalling. This signalling by the network node 110 may also be performed by using Downlink Control Information, DCI, signaling, Media Access Control CE, MAC CE, signaling, or Radio Resource Control, RRC, signaling.

It should also be noted that although from the network node's point of view, the D2D subframe configuration could be the same, i.e. the network node 110 may allocate a subframe resource pool for D2D from a network perspective, while the sent signalling for the first and second wireless device 121,122 could be different, i.e. the allocated subframe for a single D2D pair of wireless devices would be decided in a specific way for each wireless device, which may be only a sub-set of the total subframe resource pool for D2D. In this way, the collision within D2D communication between D2D pairs of wireless device may be pre-avoided at this stage to some degree.

In some embodiments, the adjustment information may relate to a limit on the number of HARQ A/N feedback transmissions carried by a single subframe on the DCCH. This limit may be set arbitrarily by the network node 110 in order to balance the HARQ A/N feedback transmission load on different subframes. Alternatively, this limit may already be configured in the first and second wireless device 121, 122, e.g. fixed or set in the first and second wireless device 121, 122. The first and second wireless device 121, 122 may be configured or updated with this limit at any time.

An otherwise straightforward solution to balance the HARQ A/N feedback transmission load on different subframes is to indicate to the wireless device that "the HARQ A/N feedback transmission, for the received data transmission Tx on subframe A, originally sent on subframe B should be delayed to subframe C". This is really complicated signalling and would cost more signaling overhead. Further, the cost would be even higher, when there are multiple HARQ A/N feedback locations to adjust.

However, by relying on a maximum number, i.e. a limit, of HARQ A/N feedback transmissions on a single subframe, the signalling is made simple and compatible to all subframes.

Example of embodiments of a method performed by a network node 110 for enabling HARQ transmissions in a D2D communication between a first and a second wireless device 121,122 in a wireless telecommunications network 100, will now be described with reference to a flowchart depicted in FIG. 12.

Figure 12:
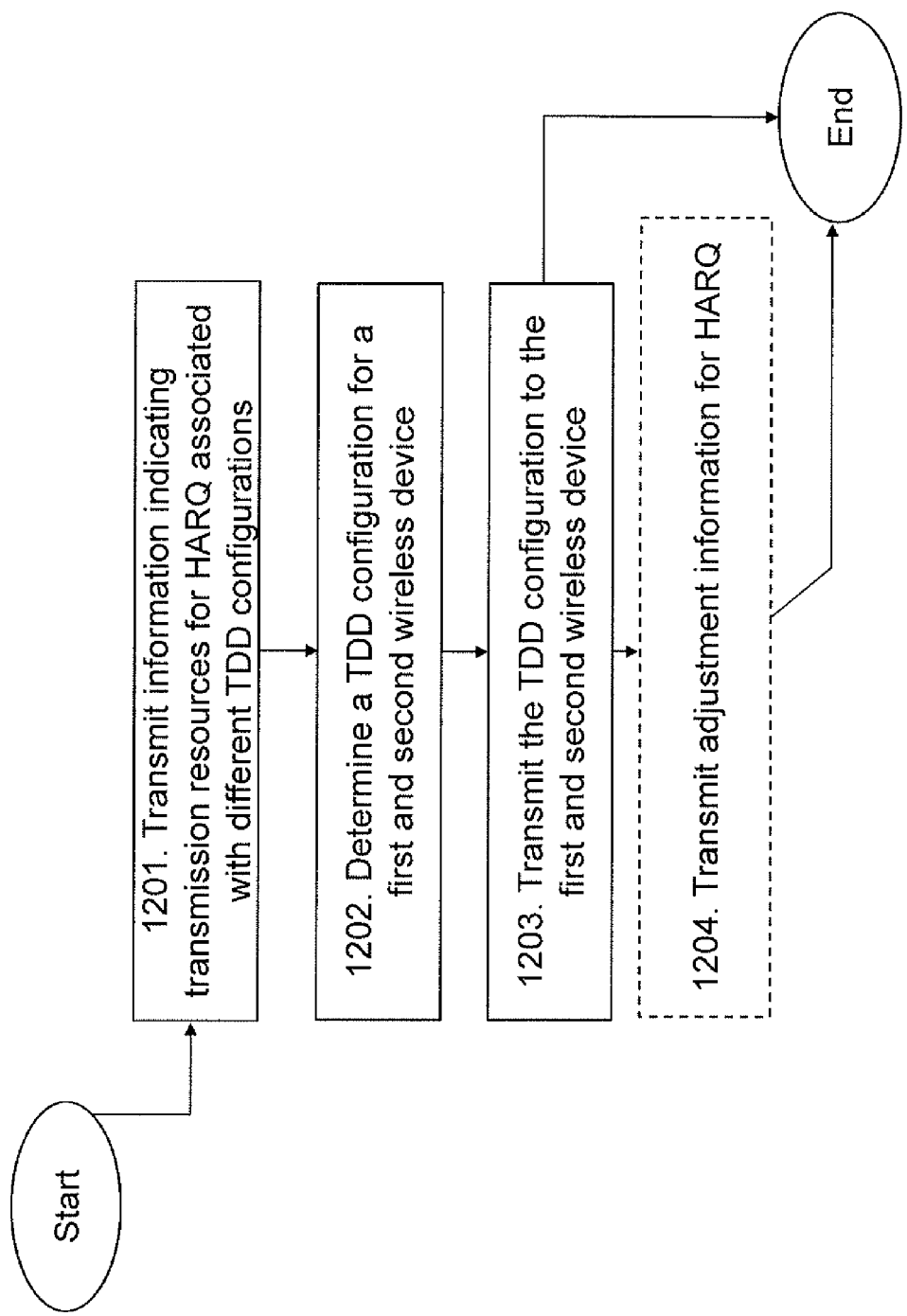
FIG. 12 is a flowchart depicting embodiments of a method in a network node.

FIG. 12 is an illustrated example of exemplary actions or operations which may be taken by the network node 110. The first and second wireless devices 121, 122 are served by the network node 110 in the wireless telecommunications network 100. The method may comprise the following actions, which actions may be taken in any suitable order.

Action 1201. In this action, the network node 110 transmits information to at least the first and second wireless device 121,122 indicating transmission resources to be used by at least the first and second wireless device 121,122 when transmitting a HARQ transmission for a received data transmission in the D2D communication. This information is associated with one or more TDD configurations.

This may refer to any one of Action 701 and Action 702 described in reference to FIG. 7.

In some embodiments, the information indicating transmission resources is a subframe mapping information that is common for all TDD configurations, and specific for each D2D compatible subframe. In this case, the network node 110 may transmit the subframe mapping information to all wireless devices being served by the network node 110. In some embodiments, the information indicating transmission resources is location separation information of the transmission resources to be used for HARQ such that the locations of the transmission resources used for HARQ are orthogonal to each other. In this case, the location separation information is specific for each of the first and second wireless device 121,122. Also, in this case, the network node 110 may transmit the separation information specific for each of the first and second wireless device 121,122 to each of the first and second wireless device 121,122 separately.

In some embodiments, the network node 110 may transmit the information simultaneously as, or as a part of, the transmission of a TDD configuration in Action 1203. In some embodiments, the network node 110 may transmit the information as part of a Downlink Control Information, DCI, signaling, Media Access Control CE, MAC CE, signaling, or Radio Resource Control, RRC, signaling.

Action 1202. In this action, the network node 110 determines a TDD configuration of the one or more TDD configurations for data transmissions in the D2D communication between the first and the second wireless device 121,122.

This refers to the Action 703 described in reference to FIG. 7.

Action 1203. When a TDD configuration has been determined, the network node 110 transmits the determined TDD configuration to the first and second wireless device 121, 122. In some embodiments, the network node 110 may transmit the determined TDD configuration as part of a Downlink Control Information, DCI, signaling, Media Access Control CE, MAC CE, signaling, or Radio Resource Control, RRC, signaling.

This also refers to the Action 703 described in reference to FIG. 7.

Action 1204. In this optional action, the network node 110 may transmit adjustment information for the HARQ transmission to the first and second wireless device 121,122. In some embodiments, this adjustment information may be delay adjustment information for the HARQ timing based on the determined TDD configuration. In this case, the delay adjustment information for the HARQ timing to the first and second wireless device 121,122 may be further based on a change of the D2D compatible subframes for data transmissions in the D2D communication between the first and second wireless device 121,122. In some embodiments, the adjustment information may relate to a limit on the number of HARQ A/N feedback transmissions carried by a single subframe. Furthermore, it should be noted that the network node 110 also may transmit a D2D subframe configuration to the first and second wireless device 121,122. This may be performed prior to any of the Actions 701-705.

This refers to the Action 706 described in reference to FIG. 7.

Example of embodiments of a method performed by the first wireless device 121 for performing HARQ transmissions in a D2D communication with a second wireless device 122 in a wireless telecommunications network 100, will now be described with reference to a flowchart depicted in FIG. 13.

Figure 13:
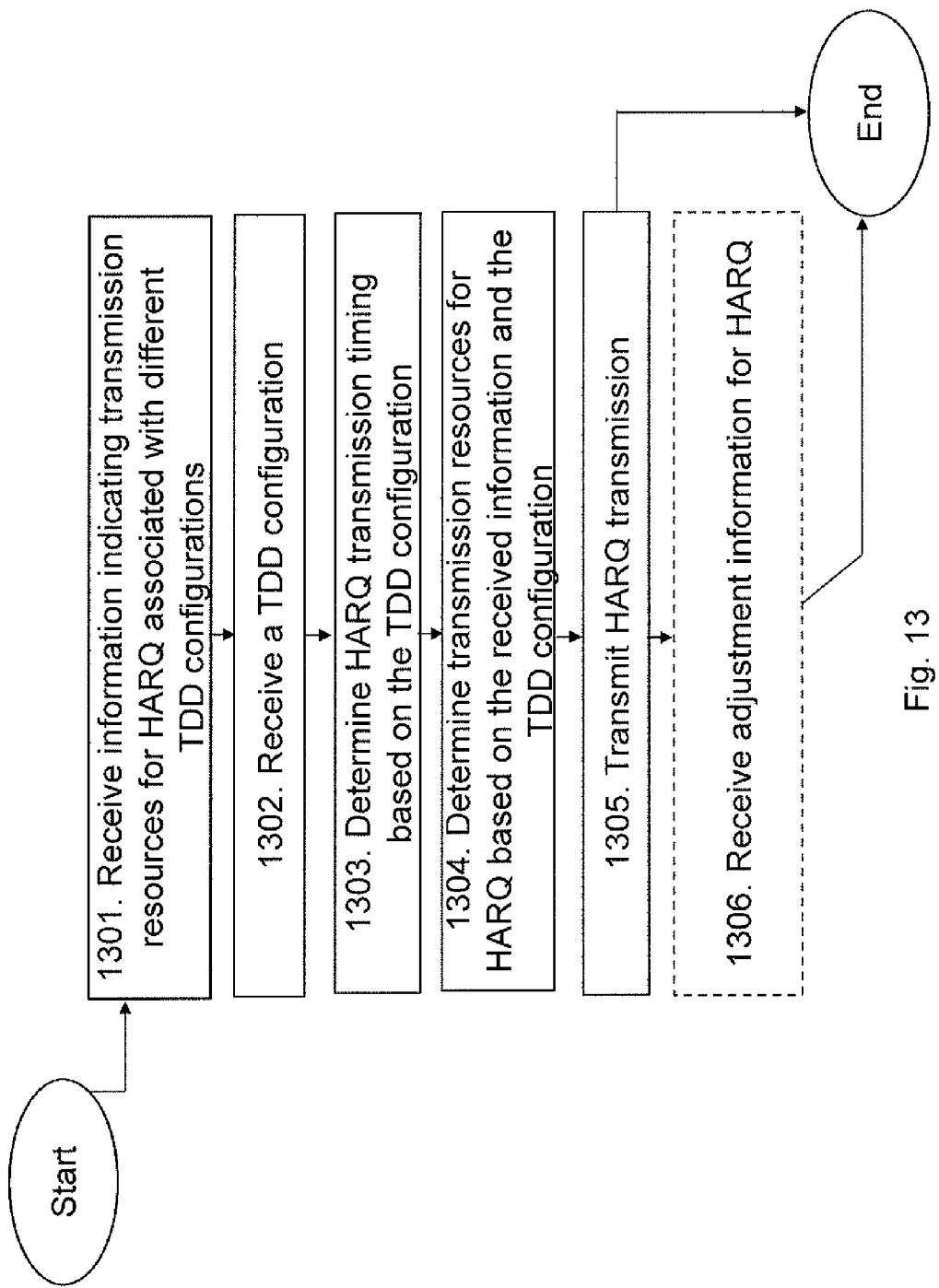
FIG. 13 is a flowchart depicting embodiments of a method in a first wireless device.

FIG. 13 is an illustrated example of exemplary actions or operations which may be taken by the network node 110. The first and second wireless devices 121, 122 are served by the network node 110 in the wireless telecommunications network 100. The method may comprise the following actions, which actions may be taken in any suitable order.

Action 1301. In this action, the first wireless device 121 receives information from the network node 110 indicating transmission resources to be used by the first wireless device 121 when transmitting a HARQ transmission to the second wireless device 122 for a received data transmission in the D2D communication. This information is associated with one or more Time-Division Duplexing, TDD, configurations. This action may refer to any one of Action 701 and Action 702 described in reference to FIG. 7.

In some embodiments, the information indicating transmission resources is subframe mapping information. In some embodiments, information indicating transmission resources is location separation information specific for each of the first and second wireless device 121,122 of the transmission resources to be used for HARQ. In some embodiments, the first wireless device 121 may receive the information simultaneously as, or as a part of, the reception of a TDD configuration in Action 1302. In some embodiments, the network node 110 may receive the information as part of a Downlink Control Information, DCI, signaling, Media Access Control CE, MAC CE, signaling, or Radio Resource Control, RRC, signaling.

Action 1302. In this action, the first wireless device 121 receives a TDD configuration of the one or more TDD configurations from the network node 110 for data transmissions in the D2D communication with the second wireless device 122. This action refers to the Action 703 described in reference to FIG. 7.

In some embodiments, the first wireless device 121 may receive the TDD configuration as part of a Downlink Control Information, DCI, signaling, Media Access Control CE, MAC CE, signaling, or Radio Resource Control, RRC, signaling.

Action 1303. When the first wireless device 121 has received the TDD configuration, the first wireless device 121 determines a HARQ transmission timing for a received data transmissions in the D2D communication based on the received TDD configuration. This action refers to the Action 704 described in reference to FIG. 7.

Action 1304. In this action, the first wireless device 121 determines transmission resources to be used when transmitting a HARQ transmission for received data transmissions in the D2D communication based on the received information indicating the transmission resources and the determined HARQ transmission timing. This action refers to the Action 705 described in reference to FIG. 7.

Action 1305. When the HARQ timing and the transmission resources have been determined, the first wireless device 121 transmits a HARQ transmission on the determined transmission resources to the second wireless device 121 in response to receiving a data transmission from the second wireless device 122 in the D2D communication. This action also refers to the Action 705 described in reference to FIG. 7.

Action 1306. In some embodiments, the first wireless device 121 may receive adjustment information for the HARQ from the network node 110. This action refers to the Action 706 described in reference to FIG. 7.

In some embodiments, this adjustment information may be delay adjustment information for the HARQ timing based on the determined TDD configuration. In this case, the delay adjustment information for the HARQ timing may further be based on a change of the D2D compatible subframes for data transmissions in the D2D communication between the first and second wireless device 121,122. In some embodiments, the adjustment information may relate to a limit on the number of HARQ A/N feedback transmissions carried by a single subframe on the DCCH. Optionally, in some embodiments, the adjustment information may already be configured in the first wireless device 121 e.g. fixed or set in the first wireless device 121. The first wireless device 121 may be configured or updated with this information at any time.

Furthermore, it should be noted that the first wireless device 121 may receive a D2D subframe configuration from the network node 110. This may be performed prior to or after any one of the Actions 1301-1305.

Figure 14:
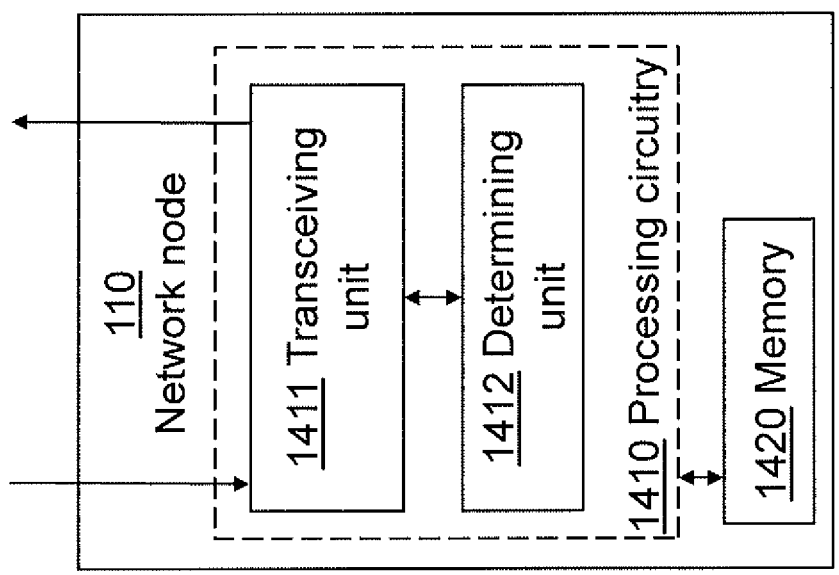
FIG. 14 is a block diagram depicting embodiments of a network node.

To perform the method actions in the network node 110 for enabling HARQ transmissions in a D2D communication between the first and the second wireless device 121, 122 in a wireless communication network 100, the network node 110 may comprises the following arrangement depicted in FIG. 14.

FIG. 14 shows a schematic block diagram of embodiments of the network node 110. The first and second wireless devices 121, 122 are served by the network node 110.

The network node 110 comprises a transceiving unit 1411, which may also be referred to as a transceiver or a transceiving device or circuitry. The transceiving unit 1411 is configured to transmit information to at least the first and second wireless device 121,122 indicating transmission resources to be used by at least the first and second wireless device 121,122 when transmitting a HARQ transmission for a received data transmission in the D2D communication, which information is associated with one or more Time-Division Duplexing, TDD, configurations. The transceiving unit 1411 is also configured to transmit a determined TDD configuration to the first and second wireless device 121, 122. The TDD configuration is determined by a determining unit 1412 as described below.

In some embodiments, the information indicating transmission resources is a subframe mapping information that is common for all TDD configurations, and specific for each D2D compatible subframe. In this case, transceiving unit 1411 may transmit the subframe mapping information to all wireless devices being served by the network node 110.

In some embodiments, the information indicating transmission resources is location separation information of the transmission resources to be used for HARQ such that the locations of the transmission resources used for HARQ are orthogonal to each other. In this case, the location separation information is specific for each of the first and second wireless device 121,122. Also, in this case, transceiving unit 1411 may transmit the separation information specific for each of the first and second wireless device 121,122 to each of the first and second wireless device 121,122 separately.

In some embodiments, transceiving unit 1411 may transmit the information simultaneously as, or as a part of, the transmission of the determined TDD configuration. In some embodiments, transceiving unit 1411 may transmit the information and the determined TDD configuration as part of a Downlink Control Information, DCI, signaling, Media Access Control CE, MAC CE, signaling, or Radio Resource Control, RRC, signaling.

In this optional action, transceiving unit 1411 may transmit adjustment information for the HARQ transmission to the first and second wireless device 121,122. In some embodiments, this adjustment information may be delay adjustment information for the HARQ timing based on the determined TDD configuration. In this case, the delay adjustment information for the HARQ timing to the first and second wireless device 121,122 may be further based on a change of the D2D compatible subframes for data transmissions in the D2D communication between the first and second wireless device 121,122. In some embodiments, the adjustment information may relate to a limit on the number of HARQ A/N feedback transmissions carried by a single subframe. Furthermore, it should be noted that the transceiving unit 1411 also may transmit a D2D subframe configuration to the first and second wireless device 121,122.

The network node 110 also comprises a determining unit 1412, which may also be referred to as a determination device or circuitry. The determining unit 1412 is configured to determine a TDD configuration for data transmissions in the D2D communication between the first and the second wireless device 121,122. This is described in more detail in Action 703 described in reference to FIG. 7.

The network node 110 may comprise a processing circuitry 1410, which may also be referred to as a processor or a processing unit. The processing circuitry 1410 may comprise one or more of the transceiving unit 1411 and the determining unit 1412.

The embodiments for enabling HARQ transmissions in a D2D communication between the first and the second wireless device 121, 122 in a wireless communication network 100 may be implemented through one or more processors, such as the processing circuitry 1410 in the network node 110 depicted in FIG. 14, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1410 in the network node 110. The computer program code may e.g. be provided as pure program code in the network node 110 or on a server and downloaded to the network node 110.

The network node 110 may further comprise a memory 1420 comprising one or more memory units. The memory 1420 may be arranged to be used to store data, such as, e.g. the information associated with wireless devices that are comprised in a subset of wireless devices but not yet scheduled, to perform the methods herein when being executed in the network node 110.

Those skilled in the art will also appreciate that the processing circuitry 1410 and the memory 1420 described above may refer to a combination of analog and digital circuits, and/or one or more processors configured with software and/or firmware, e.g. stored in a memory, that when executed by the one or more processors such as the processing circuitry 1410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 15:
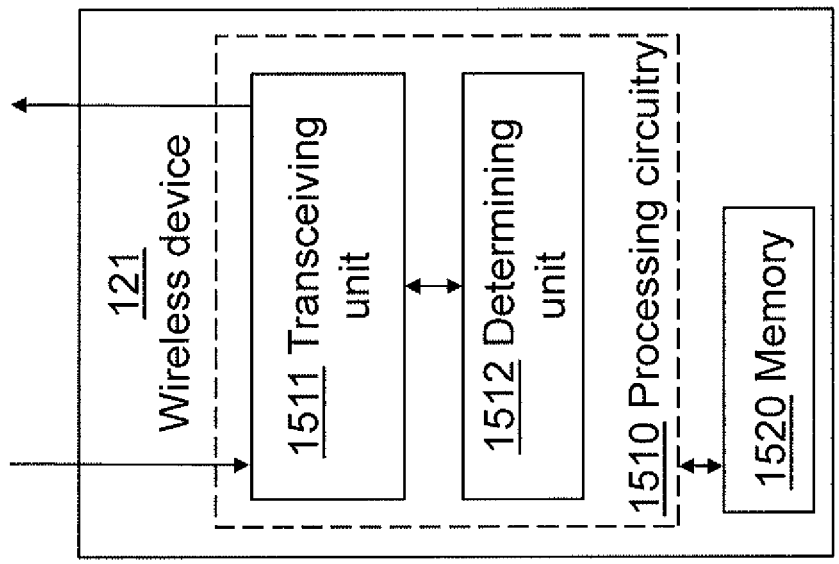
FIG. 15 is a block diagram depicting embodiments of a first wireless device.

To perform the method actions in the first wireless device 121 for performing HARQ transmissions in a D2D communication with a second wireless device 122 in a wireless telecommunications network 100, the first wireless device 121 may comprises the following arrangement depicted in FIG. 15.

FIG. 15 shows a schematic block diagram of embodiments of the first wireless device 121. The first and second wireless devices 121, 122 are served by the network node 110.

The first wireless device 121 comprises a transceiving unit 1511, which may also be referred to as a transceiver or a transceiving device or circuitry. The transceiving unit 1411 is configured to receive information from the network node 110 indicating transmission resources to be used by the first wireless device 121, when transmitting a HARQ transmission to the second wireless device 122 for a received data transmission in the D2D communication, which information is associated with one or more Time-Division Duplexing, TDD, configurations. The transceiving unit 1511 is also configured to receive a TDD configuration from the network node 110 for data transmissions in the D2D communication with the second wireless device 122.

Further, the transceiving unit 1511 is configured to transmit a HARQ transmission on determined transmission resources to the second wireless device 121 in response to receiving a data transmission from the second wireless device 122 in the D2D communication. The transmission resources being determined by the determining unit 1512 described below.

In some embodiments, the information indicating transmission resources is subframe mapping information. In some embodiments, information indicating transmission resources is location separation information specific for each of the first and second wireless device 121,122 of the transmission resources to be used for HARQ.

In some embodiments, the transceiving unit 1511 may receive the information simultaneously as, or as a part of, the reception of a TDD configuration in Action 1302. In some embodiments, the transceiving unit 1511 may receive the information and the TDD configuration as part of a Downlink Control Information, DCI, signaling, Media Access Control CE, MAC CE, signaling, or Radio Resource Control, RRC, signaling.

In some embodiments, the transceiving unit 1511 may receive adjustment information for the HARQ from the network node 110. In some embodiments, this adjustment information may be delay adjustment information for the HARQ timing based on the determined TDD configuration. In this case, the delay adjustment information for the HARQ timing may further be based on a change of the D2D compatible subframes for data transmissions in the D2D communication between the first and second wireless device 121,122. In some embodiments, the adjustment information may relate to a limit on the number of HARQ A/N feedback transmissions carried by a single subframe on the DCCH.

The first wireless device 121 also comprises a determining unit 1512, which may also be referred to as a determination device or circuitry. The determining unit 1512 is configured to determine a HARQ transmission timing for received data transmissions in the D2D communication based on the received TDD configuration. The determining unit 1512 is also configured to determine transmission resources to be used when transmitting a HARQ transmission for received data transmissions in the D2D communication based on the received information indicating the transmission resources and the determined HARQ transmission timing.

The first wireless device 121 may comprise a processing circuitry 1510, which may also be referred to as processing unit. The processing circuitry 1510 may comprise one or more of the transceiving unit 1511 and the determining unit 1512.

The embodiments for performing HARQ transmissions in a D2D communication with a second wireless device 122 in a wireless telecommunications network 100, may be implemented through one or more processors, such as the processing circuitry 1510 in the first wireless device 121 depicted in FIG. 15, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1510 in the first wireless device 121. The computer program code may e.g. be provided as pure program code in the first wireless device 121 or on a server and downloaded to the first wireless device 121.

The first wireless device 121 may further comprise a memory 1520 comprising one or more memory units. The memory 1520 may be arranged to be used to store data, such as, e.g. the information associated with wireless devices that are comprised in a subset of wireless devices but not yet scheduled, to perform the methods herein when being executed in the first wireless device 121.

Those skilled in the art will also appreciate that the processing circuitry 1510 and the memory 1520 described above may refer to a combination of analog and digital circuits, and/or one or more processors configured with software and/or firmware, e.g. stored in a memory, that when executed by the one or more processors such as the processing circuitry 1510 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described methods, the network node 110 or the first wireless device 121, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method performed by a network node for enabling Hybrid Automatic Repeat request (HARQ) transmissions in a device-to-device (D2D) communication between a first wireless device and a second wireless device in a wireless telecommunications network, wherein the first wireless device and the second wireless device are served by the network node in the wireless telecommunications network, the method comprising:
transmitting information to at least the first wireless device and the second wireless device indicating transmission resources to be used by at least the first wireless device and the second wireless device when transmitting a HARQ acknowledgement (A/N) transmission for a received data transmission in the D2D communication, wherein the information is associated with one or more Time-Division Duplexing (TDD) configurations;
determining a TDD configuration of the one or more TDD configurations to be used for data transmissions in the D2D communication between the first wireless device and the second wireless device;
transmitting the determined TDD configuration to the first wireless device and the second wireless device; and
transmitting an adjustment information for the HARQ A/N transmission to the first wireless device and to the second wireless device, wherein the adjustment information comprises delay adjustment information for the HARQ timing based on the determined TDD configuration, and wherein the delay adjustment information is further based on a change of D2D compatible subframes for data transmissions in the D2D communication between the first wireless device and the second wireless device.

2. The method according to claim 1, wherein:
the information indicating transmission resources comprises a subframe mapping information that is common for all TDD configurations and specific for each D2D compatible subframe; and
the transmitting of the information occurs to all wireless devices being served by the network node.

3. The method according to claim 1, wherein the information indicating transmission resources comprises a location separation information of the transmission resources to be used for HARQ such that locations of the transmission resources used for HARQ are orthogonal to each other, wherein the location separation information is specific for each of the first wireless device and the second wireless device.

4. The method according to claim 3, wherein the transmitting comprises transmitting the location separation information specific for each of the first wireless device and the second wireless device to each of the first wireless device and the second wireless device separately.

5. The method according to claim 3, wherein the transmitting of the information indicating the transmission resources is performed simultaneously as, or as a part of, the transmitting of the determined TDD configuration.

6. The method according to claim 1, further comprising:
transmitting another adjustment information for the HARQ A/N transmission to the first wireless device and to the second wireless device, wherein the another adjustment information comprises another delay adjustment information for the HARQ timing based on the determined TDD configuration, and wherein the another adjustment information for the HARQ A/N transmission is based on a maximum number of HARQ A/N transmissions that is to be carried in a single subframe.

7. The method according to claim 1, wherein the transmitting of the information indicating the transmission resources or the transmitting of the determined TDD configuration is performed as part of a Downlink Control Information (DCI) signaling; a Media Access Control Control Element (MAC CE) signaling; or a Radio Resource Control (RRC) signaling.

8. An network node for enabling Hybrid Automatic Repeat request (HARQ) transmissions in a device-to-device (D2D) communication between a first wireless device and a second wireless device in a wireless telecommunications network, wherein the first wireless device and the second wireless device are served by the network node in the wireless telecommunications network, wherein the network node comprises:
- a processing circuitry coupled with a memory, wherein the processing circuitry is configured to,
    - transmit information to at least the first wireless device and the second wireless device indicating transmission resources to be used by at least the first wireless device and the second wireless device when transmitting a HARQ acknowledgement (A/N) transmission for a received data transmission in the D2D communication, wherein the information is associated with one or more Time-Division Duplexing (TDD) configurations,
    - determine a TDD configuration of the one or more TDD configurations for data transmissions in the D2D communication between the first wireless device and the second wireless device,
    - transmit the determined TDD configuration to the first wireless device and the second wireless device, and
    - transmit an adjustment information for the HARQ A/N transmission to the first wireless device and to the second wireless device, wherein the adjustment information comprises delay adjustment information for the HARQ timing based on the determined TDD configuration, and wherein the delay adjustment information is further based on a change of D2D compatible subframes for data transmissions in the D2D communication between the first wireless device and the second wireless device.

9. A method performed by a first wireless device for performing Hybrid Automatic Repeat request (HARQ) transmissions in a device-to-device (D2D) communication with a second wireless device in a wireless telecommunications network, wherein the first wireless device and the second wireless device are served by a network node in the wireless telecommunications network, the method comprising:
- receiving information from the network node indicating transmission resources to be used by the first wireless device when transmitting a HARQ acknowledgement (A/N) transmission to the second wireless device for a received data transmission in the D2D communication, wherein the information is associated with one or more Time-Division Duplexing (TDD) configurations;
- receiving a TDD configuration of the one or more TDD configurations from the network node for data transmissions in the D2D communication with the second wireless device;
- receiving an adjustment information for the HARQ A/N transmission from the network node, wherein the adjustment information comprises a delay adjustment information for the HARQ timing based on the TDD configuration, wherein the delay adjustment information is further based on a change of D2D compatible subframes for data transmissions in the D2D communication between the first wireless device and the second wireless device;
- determining a HARQ A/N transmission timing for received data transmissions in the D2D communication based on the received TDD configuration;
- determining transmission resources to be used when transmitting a HARQ A/N transmission for received data transmissions in the D2D communication based on the received information indicating the transmission resources and the determined HARQ A/N transmission timing; and
- transmitting the HARQ A/N transmission on the determined transmission resources to the second wireless device in response to receiving a data transmission from the second wireless device in the D2D communication.

10. The method according to claim 9, wherein the information indicating transmission resources comprises a subframe mapping information.

11. The method according to claim 9, wherein the information indicating transmission resources comprises a location separation information specific for each of the first wireless device and the second wireless device of the transmission resources to be used for HARQ.

12. The method according to claim 11, wherein the receiving of the information indicating the transmission resources is performed simultaneously as or as a part of the receiving of the TDD configuration.

13. The method according to claim 9, further comprising:
- receiving another adjustment information for the HARQ A/N transmission from the network node, wherein the another adjustment information comprises another delay adjustment information for the HARQ timing, and wherein the another adjustment information for the HARQ A/N transmission is based on a maximum number of HARQ A/N transmissions that can be carried in a single subframe.

14. A first wireless device for performing Hybrid Automatic Repeat request (HARQ) transmissions in a device-to-device (D2D) communication with a second wireless device in a wireless telecommunications network, wherein the first wireless device and the second wireless device are served by a network node in the wireless telecommunications network, the first wireless device comprising:
- a processing circuitry coupled with a memory, wherein the processing circuitry is configured to,
    - receive information from the network node indicating transmission resources to be used by the first wireless device, when transmitting a HARQ acknowledgement (A/N) transmission to the second wireless device for a received data transmission in the D2D communication, wherein the information is associated with one or more Time-Division Duplexing (TDD) configurations,
    - receive a TDD configuration of the one or more TDD configurations from the network node for data transmissions in the D2D communication with the second wireless device,
    - receive an adjustment information for the HARQ A/N transmission from the network node, wherein the adjustment information comprises a delay adjustment information for the HARQ timing based on the TDD configuration, wherein the delay adjustment information is further based on a change of D2D compatible subframes for data transmissions in the D2D communication between the first wireless device and the second wireless device,
    - determine a HARQ A/N transmission timing for received data transmissions in the D2D communication based on the received TDD configuration,
    - determine transmission resources to be used when transmitting a HARQ A/N transmission for received data transmissions in the D2D communication based on the received information indicating the transmission resources and the determined HARQ A/N transmission timing, and transmit the HARQ A/N transmission on the determined transmission resources to the second wireless device in response to receiving a data transmission from the second wireless device in the D2D communication.

* * * * *